United States Patent [19]
Boyar et al.

[11] Patent Number: 4,829,191
[45] Date of Patent: May 9, 1989

[54] SWITCHABLE RADIOACTIVE NEUTRON SOURCE DEVICE

[75] Inventors: Robert E. Boyar, La Grange; Alexander DeVolpi, Bolingbrook; George S. Stanford, Downers Grove; Edgar A. Rhodes, Woodridge, all of Ill.

[73] Assignee: The United States of America as represented by the United States Department of Energy, Washington, D.C.

[21] Appl. No.: 117,602

[22] Filed: Nov. 6, 1987

[51] Int. Cl.$^4$ ............................................. G21F 5/00
[52] U.S. Cl. ........................... 250/496.1; 250/493.1; 250/505.1
[58] Field of Search ............... 256/496.1, 497.1, 498.1, 256/251, 506.1, 505.1, 493.1

[56] References Cited

U.S. PATENT DOCUMENTS

| | | | |
|---|---|---|---|
| 2,868,990 | 1/1956 | Reardon et al. | 376/191 |
| 3,389,257 | 6/1968 | Caldwell et al. | 250/498.1 |
| 3,515,871 | 6/1970 | Johnson | 250/496.1 |
| 3,659,106 | 4/1972 | Cason | 250/106 S |
| 3,800,145 | 3/1974 | Caldwell | 250/253 |
| 4,041,309 | 8/1977 | Hopkinson | 250/262 |

Primary Examiner—Bruce C. Anderson
Assistant Examiner—Michael Aronoff
Attorney, Agent, or Firm—Frank J. Kozak; Paul A. Gottlieb; William R. Moser

[57] ABSTRACT

This invention is a switchable neutron generating apparatus comprised of a pair of plates, the first plate having an alpha emitter section on it and the second plate having a target material portion on it which generates neutrons when its nuclei absorb an alpha particle. In operation, the alpha portion of the first plate is aligned with the neutron portion of the second plate to produce neutrons and brought out of alignment to cease production of neutrons.

33 Claims, 3 Drawing Sheets

SWITCHABLE RADIOACTIVE NEUTRON SOURCE DEVICE

CONTRACTUAL ORIGIN OF THE INVENTION

The United States Government has rights to this invention pursuant to Contract No. W-31-109-ENG-38 between the U.S. Department of Energy and the University of Chicago representing Argonne National Laboratory.

BACKGROUND OF THE INVENTION

This invention is a switchable radioactive neutron source device. It can provide a controllable ON or OFF generation of neutrons or a coded pulsed generation of neutrons by a sequence of switching. This neutron source device has various present and potential applications both in scientific research and in inspection and analysis techniques.

Current neutron source devices are of two types: the standard radioisotope source and the accelerator source. The standard radioisotope source employs a radioactive mixture of alpha emitter and target material which emits neutrons constantly. Therefore, it must be extensively shielded to protect operating personnel even when not in use. The accelerator neutron source requires bulky equipment, considerable electric power, and highly trained operating personnel, yet provides low reliability and maintainability.

In applications involving inspection of a sample for content of fissile material, a standard neutron source is used for irradiation of a sample, after which a count is made of delayed neutrons from fissionable isotopes in the samples. Typically, an object to be analyzed is shuttled into the presence of the radioisotope source from a remote shielded area and back again.

A potential application employing neutron irradiation is the detection of explosive materials attempted to be smuggled onto aircraft. High explosives tend to be rich in nitrogen, and so a possible detection scheme would have a suitcase on a conveyor belt passing through a neutron flux long enough for it to be tested for the presence of an unusual amount of nitrogen. Possible gamma ray detection techniques for this purpose include spectral analysis of prompt gamma rays from neutron capture or from inelastic neutron scattering or of decay gammas from neutron activation.

Other potential applications include nondestructive testing and subcriticality monitoring.

It is therefore an object of this invention to provide a reliable neutron source device that can be switched ON for use and OFF when not in use to eliminate costly shielding.

It is a further object of this invention to provide a neutron source that is portable and easy to use.

It is still a further object of this invention to provide a neutron source that can be pulsed at predetermined intervals for detection techniques that use time-coded sources.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

This invention is an apparatus that provides a controllable source of neutrons by means of a series of disks, alternately containing alpha emitters and targets which are brought into alignment for generation of neutrons and brought out of alignment to cease generation of neutrons. This controllable feature provides improved ease of use for current applications and enables new applications relating to analysis and inspection of samples through neutron irradiation.

DETAILED DESCRIPTION OF THE DRAWINGS

Figure 1:
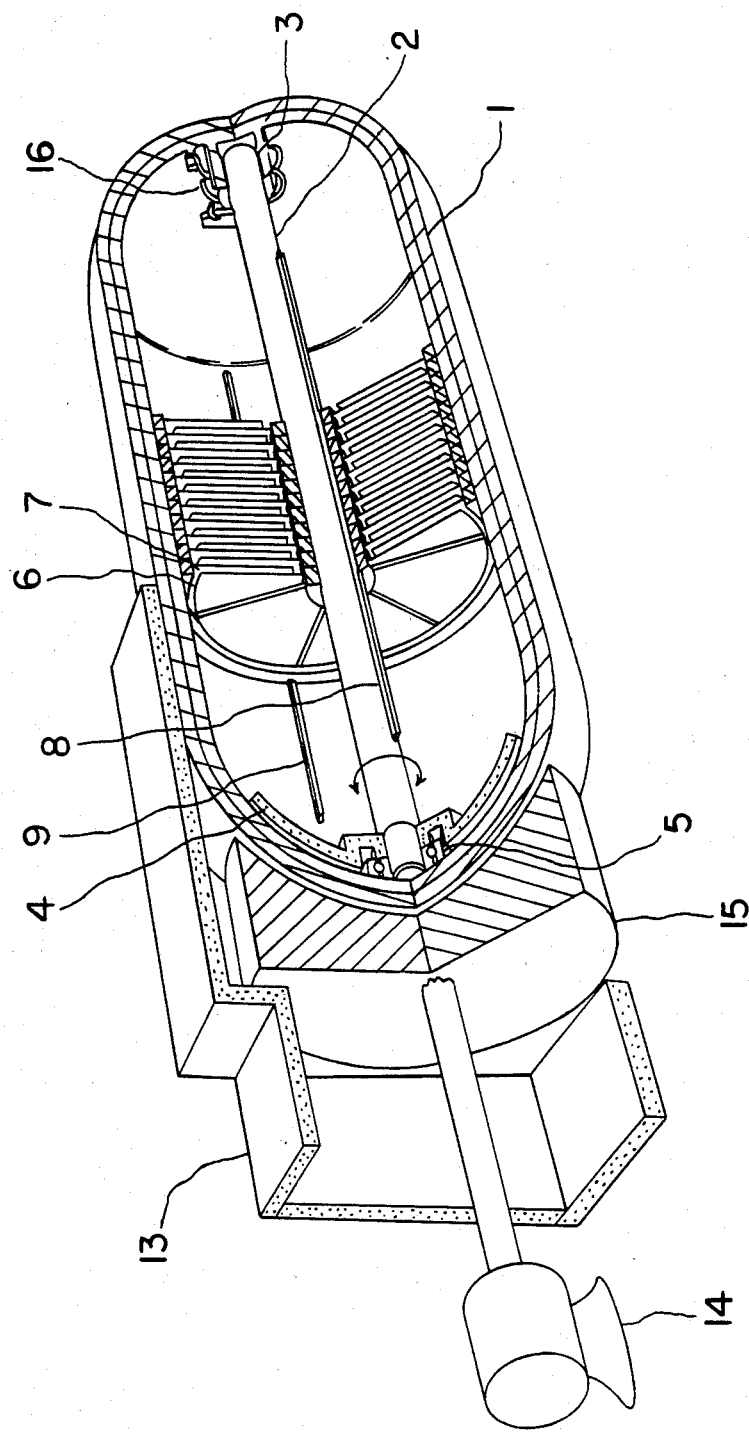
FIG. 1 is a perspective view of the invention with a cutaway to reveal internal parts.

Referring to FIG. 1, there is shown an elongated capsule 1 with hemispherical ends. Capsule 1 is cutaway to reveal its internal components. Capsule 1 is made of a durable material which allows passage of neutrons. Capsule 1 is also double walled and it should conform with requirements and practices for handling and transportation of radioactive material.

In this embodiment, capsule 1 is also made of a non-magnetic material, such as stainless steel, to permit linkage by magnetic attraction through the walls of capsule 1 thus enabling capsule 1 to be completely sealed and airtight. In this embodiment, capsule 1 is approximately 30 cm long and approximately 9 cm in diameter although the size can be changed to adapt to different applications.

Mounted in capsule 1 is rotatable shaft 2 engaged at one end by bearing 3. The opposite end of shaft 2 is affixed to armature 4, shown in cutaway, which conforms in shape to capsule 1. Armature 4 is made of a ferrous material capable of magnetic attraction. Ball bearings 5 are mounted in armature 4 to provide low friction contact between armature 4 and capsule 1.

A series of pairs of circular disks 6 and 7 are provided inside capsule 1 and about shaft 2. Twenty identical pairs of disks are provided (not all shown in FIG. 1). More or less disks could be used depending on desired neutron source strength. Reference is made to only one pair of disks, 6 and 7, with the understanding that the other pairs are identical. Disk 6 is affixed upon shaft 2 by means of key 8 so that it will rotate with shaft 2. Adjacent disk 7 is affixed to capsule 1 by key 9 and does not engage shaft 2. Key 8 is mounted on shaft 2 and provides for fixed mounting and alignment of all identical disks 6. Key 9 is mounted on the interior of capsule 1 and provides for mounting and fixed alignment of all identical disks 7.

Figure 2A:
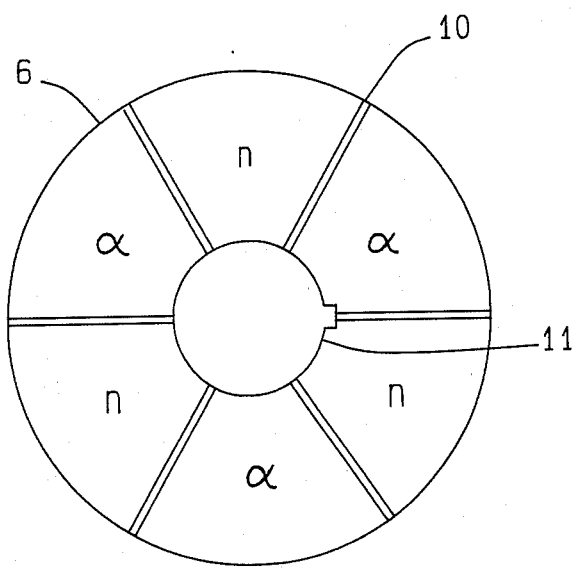
FIG. 2a shows one disk that makes up part of one embodiment of this invention.

In FIG. 2a is shown an embodiment of circular disk 6 having a notched aperture 11 in its center for affixing to shaft 2 by means of key 8. Disk 6 is divided into pie shaped sections alternately coated with an alpha emitter, such as $^{238}$plutonium, indicated by the symbol α and a target material such as beryllium indicated by the letter n that emits neutrons when struck by α particles. In this embodiment, a disk is divided into 6 sections, three of alpha emitters and three of targets. The disks are coated on both sides with like sections of alpha emitters exactly aligned on both sides and like sections of targets exactly aligned on both sides.

Figure 2B:
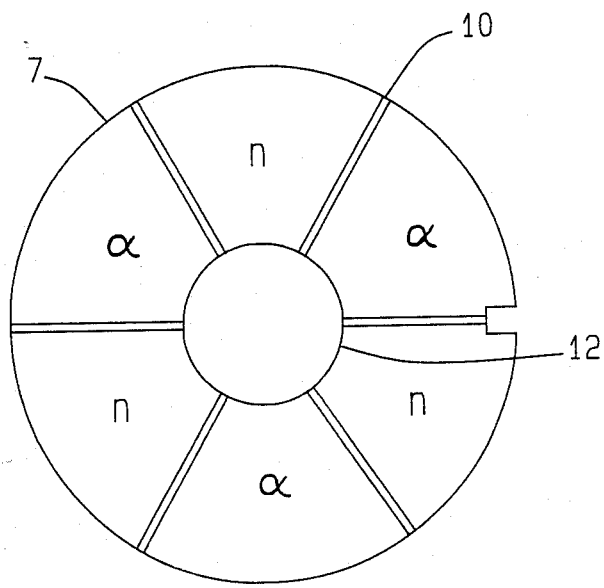
FIG. 2b shows another disk that makes up part of one embodiment of this invention.

Disk 7, shown in FIG. 2b, is affixed to capsule 1 by means of key 9 and has a similar construction as disk 6 with alternating sections of alpha emitters and targets on both sides of the disk. The dimensions of disk 7 may be slightly larger than disk 6 to accommodate affixing to capsule 1 and permit free rotation of shaft 2 inside its center aperture 12. Also, it is notched on its outer edge to engage key 9. However, in all other respects, disk 7 is identical to disk 6 as shown in FIG. 2a.

The disks are made of a material inert with respect to the (alpha, n) reaction, such as tantalum. The alpha emitter coating may be applied by a suitable method, such as by "paint and bake" or vapor deposition. The target portion coating, such as of beryllium, may be applied by a sputtering process. In this embodiment, the alpha emitter portions and the target portions are applied to each disk so as to leave a narrow strip 10 of the inert material of the disk separating each section as indicated in FIGS. 2a and 2b. Inert strips 10 eliminate possible (alpha, n) reactions at the edges of the sections.

Referring again to FIG. 1, the end of capsule 1 containing armature 4 engages bracket 13 shown in cutaway. Inside bracket 13 is a rotary solenoid 14 which drives an electromagnet 15, also shown in cutaway. Capsule 1 fits in bracket 13 so that the end of capsule 1 is close to, but does not touch, electromagnet 15.

In the OFF state, like sections of adjacent disks are in alignment. No appreciable amount of neutrons are generated. To operate, rotary solenoid 14 is turned ON causing electromagnet 15 to rotate. Magnetic attraction between electromagnetic 15 and the armature 4 through non-magnetic walls of capsule 1 cause armature 4 and the disks 6 attached to it to rotate with the electromagnet 15. Rotation of disks 6 with respect to disks 7 brings alpha emitting portions of each disk into alignment with the target sections of the adjacent disks facing it. When a target such as beryllium comes in close proximity to an alpha emitter such as $^{238}$plutonium, the nucleus of the target absorbs an alpha particle whereupon neutrons are emitted. The neutrons are emitted in all directions. Shielding for humans is necessary when the source is in the ON state. The solenoid 14 can be devised for ON/-OFF operation, pulsed operation, or series pulsed operation. A coil spring 16 in FIG. 1 is devised to assure that alignment of alpha emitters of adjacent plates in the ON/OFF mode always occurs when the solenoid is turned OFF, effectively stopping the generation of neutrons and shutting OFF the device.

This above described arrangement utilizing the electromagnet 15 provides for a completely sealed capsule for containment of the radioactive materials within. Where such containment is not necessary other more direct rotation means can be used.

Figure 3B:
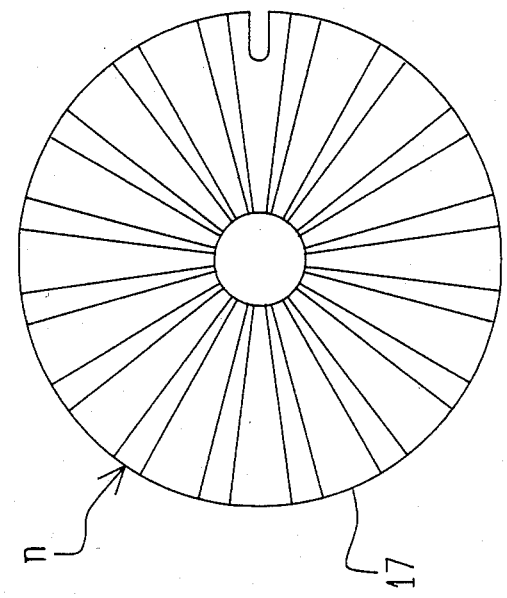
FIG. 3b shows another disk which makes up part of the aforementioned second embodiment of this invention.

Other disk arrangements can be utilized for different purposes such as rapidly pulsed sources. For example, in FIG. a is a disk having narrow sections of alpha emitters separated by larger sections 17 of inert material. FIG. 3b shows a similar arrangement of target portions on an adjacent disk. In this embodiment, the alpha emitters and targets are not both on the same side of each disk, but are on adjacent sides of adjacent disks (although both could be placed on the same side if desired).

Figure 3C:
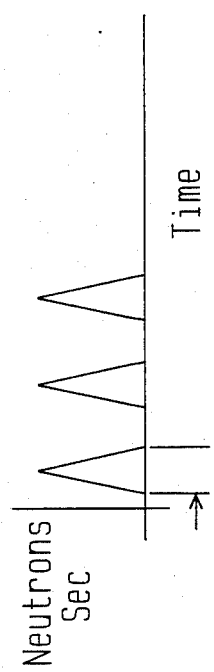
FIG. 3c is a graph depicting neutron output versus time for the aforementioned second embodiment of this invention.
Figure 3A:
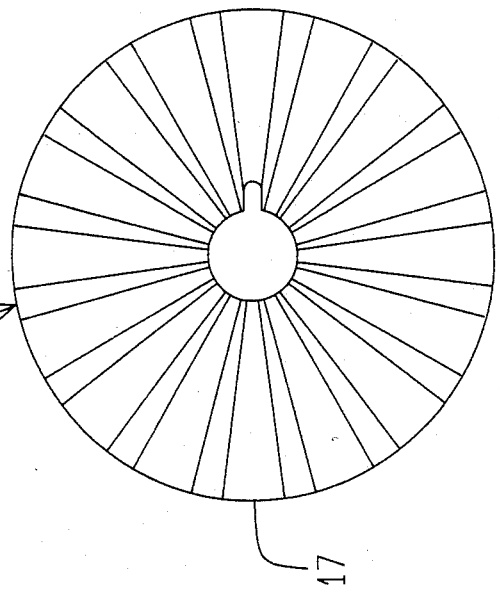
FIG. 3a shows one disk that makes up part of a second embodiment of this invention.

FIG. 3c graphically depicts the output of this type of disk arrangement. The number of neutrons, depicted on the vertical axis, is plotted versus time on the horizontal axis. The pulsed, peaked output results from rotation of the shaft.

This invention provides substantial flexibility with respect to shape, arrangement, and alignment method for the disks or plates to suit particular applications. For example, a set of movable plates coated only with target material could be swung into alignment with stationary plates coated only with alpha-emitting material by means of a rotating shaft connected to the movable plates by an arm. Alternately, the disk assembly could be donut-shaped with a pipe of arbitrary diameter through the central hole for passing samples, the rotating disks being driven by gears contacting teeth on their circumferences. In this case, the plates might also be formed of concentric drums surrounding the pipe, rather than donut-shaped circular disks and translation, rather than rotation, could be used to align the plates.

The elements used as target material on the disks for receiving the alpha particles and emitting neutrons should be chosen for relatively high yield of neutrons in the energy range of interest, such as beryllium, boron, and lithium. Beryllium provides the highest neutron yield and highest neutron energies. It is thus preferable when such factors are important as for inelastic scattering and fast neutron activation. Boron is intermediate in yield and energy and may be chosen when simulation of the neutron fission spectrum is desired. Lithium gives relatively low yield in energy and it is a candidate target when thermal neutrons are needed as for neutron capture and thermal activation. Although lithium neutrons are the most easily moderated, sufficient moderator can thermalize beryllium and boron neutrons also. However, residual high energy neutrons may sometimes excite reactions that interfere with detection of desired materials, particularly in the case of beryllium.

Beryllium also produces a relatively intense field of penetrating gamma-rays along with the neutrons, although the gamma dose rate is substantially lower than that of the neutrons. This gamma field can saturate detectors. However, collimation of the source to provide a radiation beam confined to the test region, combined with off-beam detector location and low-energy gamma-ray absorbers in front of detectors if necessary, will substantially reduce the gamma energy and intensity. Boron produces a less intense lower energy gamma field per neutron. Gamma radiation from lithium is negligible.

Suitable alpha-emitting isotopes will have the following properties (a) a half-life long enough that the source could be useful for at least six months, but short enough that the alpha intensity per gram is sufficiently high to produce enough neutron yield using a suitable target, (b) a small spontaneous neutron emission rate in comparison with the (alpha,n) neutron rate attainable for the alpha decay rate; (c) sufficiently few spontaneous gamma rays particularly of high energy; (d) daughter products that do not contribute much unwanted radiation; and (e) availability in gram quantities at a reasonable cost.

Six candidate isotopes are shown on the following table along with their properties as disk layers in combination with beryllium, boron, and lithium target layers. They are listed in order of decreasing neutron yield.

| PROPERTIES OF SELECTED (ALPHA, N) SOURCES | | | | | | | |
|---|---|---|---|---|---|---|---|
| ALPHA EMITTER | | $^{228}Th$ | $^{242}Cm$ | $^{210}Po$ | $^{227}Ac$ | $^{238}Pu$ | $^{241}Am$ |
| HALF-LIFE | | 1.91 Y | 163 D | 138 D | 21.8 Y | 87.7 Y | 432 Y |
| GAMMA-RAYS ENERGY, KEV | | 80–2600 | 44 | 800 | 50–870 | 44 | 60 |
| MREM/HR-CM$^2$ @ 1 M | | 17,000 | 0.73 | 0.45 | 230 | 0.003 | 0.63 |
| NEUTRONS | Be | 2100 | 1900 | 1200 | 190 | 5.9 | 1.1 |
| PER CM$^2$-S × | B | 600 | 610 | 470 | 55 | 2.2 | 1.1 |
| $10^4$ "ON" | Li | 100 | 42 | 10 | 8.4 | 0.64 | 0.012 |
| NEUTRON | Be | HIGH | 40 | HIGH | HIGH | 1300 | $6 \times 10^5$ |
| SWITCHING, | B | HIGH | 13 | HIGH | HIGH | 480 | $2 \times 10^5$ |
| RATIO | Li | HIGH | 0.88 | HIGH | HIGH | 14 | $6 \times 10^3$ |

The emitter layer thickness is assumed to be the range of the highest energy alpha, generally about 20 mg/cm$^2$. The gamma ray doses are per unit area of emitter layer and are constant, i.e. they do not include the relatively small gamma dose from target (alpha, n) reactions, while the neutron yields are per unit overlap area of the emitter and target layers on adjacent disks (maximum overlap area being reached in the ON position).

$^{228}$Th and $^{227}$Ac are assumed to be in equilibrium with their daughters and achieve high neutron yields despite relatively long half lives because of additional alphas from daughter decays, which unfortunately also give relatively high doses of penetrating gamma-rays that cannot be switched OFF. These two isotopes would be useful only in cases where their gamma fields are tolerable in the OFF and ON positions. Gamma doses from the other isotopes are small: $^{210}$Po has a gamma ray of moderate energy but low emission rate, and $^{242}$Cm, $^{238}$Pu and $^{241}$Am produce only very low-energy gammas that are easily shielded.

The neutron switching ratio is defined as the ratio of neutrons per second in the ON position from the (alpha,n) reactions to the total neutrons per second in the OFF position. The OFF neutron rate is equated to the spontaneous fission rate for isotopes having that decay process and the switching ratio is listed as "high" for the other isotopes. (Alpha,n) reactions and spontaneous fissions in impurities and construction materials (from stray alphas) will determine the switching ratios where listed as "high" (on the order of a million or so) and will lower somewhat the estimated numerical ratios shown.

As expected, the neutron yields and switching ratios are highest for beryllium, intermediate for boron and lowest for lithium targets. Yields were obtained from approximate calculations and do not include losses due to edge effects at disk layer boundaries or due to neutron attenuation in construction materials. With just 20 disks of 50 cm$^2$ active area per side, over $10^{10}$ n/s might be achieved for a fresh Po-Be source. Therefore, high yields and high switching ratios are attainable.

The depths of the alpha-emitter and target layers on the disks need be only slightly larger than the respective alpha particle ranges, as no further increase in neutron yield is provided by thicker layers. A coating over the alpha emitter layer prevents flaking and emission of recoiling nuclei, essential to avoid buildup of neutron background in the OFF position. This coating may be made of gold. The disk diameter and numbers of disks will depend on the source size and neutron yield requirements of specific applications. Similarly, the nominal capsule size may be increased or decreased in specific applications, depending on the neutron yield and NRC/DOT requirements. The capsule could be constructed so as to be easily carried by one person, if no shielding is needed.

Four time-coded operational modes are identified for use in various detection techniques: steady-state (0.1 second switching time), intermittent, slow pulsing (up to 10 revs/s), and fast pulsing (hundreds of revs/s).

For examination of these operational modes, consider the applicable gamma-ray detection methods. If neutron capture were to be exploited, the neutron source device could be operated in the steady-state mode. A hydrogenous moderator would be placed in front of the device to thermalize the neutrons, since the neutron capture cross section is much higher for thermal neutrons. In the case of explosives detection, the prominent 10.8 MeV gamma line from the $^{14}$N(n,gamma)$^{15}$N reaction would be observed. More sensitivity might be obtained if such a setup were operated in a pulsed mode in case there is high background coincident with the neutron source (such as gamma rays produced in the (alpha,n) reactions). If the system produced 100-microsecond pulses separated by OFF times of 1 millisecond, the gamma detectors could be turned off during the pulse thus avoiding counts coincident with the neutron source. Then the detectors could be turned on to detect the gammas from thermalized neutrons delayed by slowing down in the object being examined.

To detect gammas from inelastic scattering, relatively high energy neutrons are needed to excite the reaction and moderating material would be kept to a minimum to lessen background from capture. It would probably also be necessary to emit neutrons in a pulse train, with approximately 50 microsecond pulse length and approximately 500 microseconds between pulses to further permit capture gammas to die away between pulses. The detectors would be on during the pulse and, in the case of explosives detection, would detect the 2.3 MeV gamma characteristic of the $^{14}$N(n, n'gamma)$^{14}$N reaction.

A widely used technique is neutron activation. Gamma detectors would be turned on when the source is turned OFF to observe count rates and decay rates at energies characteristic of activation products. If thermal-neutron activation is desired, the neutron beam would be moderated by hydrogenous material. Another technique is fast-neutron activation analysis in which high energy threshold reactions like (n, 2n) and (n, p) are exploited.

For activation half-lives more than a few seconds long, a steady-state switching mode would be used. If material that activated with a half-life on the order of a few seconds were of interest, the neutron source could be operated in an intermittent steady-state mode, going through multiple cycles, if necessary, to build up count statistics. For shorter half-lives, a slow pulsed mode might be useful to build up statistics.

The estimated yearly dose rate for a switched $^{238}$Pu-Be source in the OFF position compares favorably with the 148 mrem average human dose per year, so shielding would not be required for comparable switched sources in the OFF position.

The present invention has substantial potential advantages over present unswitched radioactive sources, such as portability in the OFF position without shielding, the extension of radioisotope sources to the realm of time-coded source techniques—for safeguards, antiterrorist, weapons treaty verification, medical, and space applications, and reduced personnel exposure (or the same exposure with less shielding). It also has significant potential advantages over accelerator-based neutron sources: no bulky ancillary equipment is required and only nominal electrical power is needed (as long as fast rotation is not required). Battery operation at remote sites and in space would be feasible. It would also provide much better reliability and maintainability than afforded by accelerators.

The embodiments of this invention in which an exclusive property or privilege is claimed are defined as follows:

1. A switchable neutron generating device comprising:
   a. a first plate having an alpha emitting portion thereon, said first plate having a central aperture therein;
   b. a second plate adjacent to said first plate and having a target portion thereof, said second plate also having a central aperture therein;
   c. a shaft passing through and connected at the central aperture of one of said plates and passing through but not connected to the central aperture of the other of said plates; and
   d. rotating means for rotating said shaft and thereby one of said plates with respect to the other plate whereby neutrons can be generated from the target portion of said second plate.

2. The apparatus of claim 1 in which said first plate has a plurality of alpha emitting portions.

3. The apparatus of claim 2 in which said second plate has a plurality of target portions.

4. The apparatus of claim 2 in which the alpha emitting portions of said first plate are selected from the group consisting of $^{242}$curium, $^{241}$americium, $^{238}$plutonium, $^{227}$actinium, $^{228}$thorium, and $^{210}$polonium.

5. The apparatus of claim 3, in which the target portions of said second plate are selected from the group consisting of beryllium, boron, and lithium.

6. The apparatus of claim 3 in which the alpha emitting portions of said first plate are pie shaped segments of equal size and equally spaced about the plate.

7. The apparatus of claim 6 in which the target portions of said second plate are pie shaped segments of equal size and equally spaced about the plate.

8. The apparatus of claim 7 in which said first plate includes target portions positioned between the alpha emitting portions and said second plate includes alpha emitting portions positioned between said target portions.

9. The apparatus of claim 8 in which the alpha emitter portions and the target portions of said first and said second plates are separated by inert portions.

10. The apparatus of claim 9 including a plurality of first and second plate pairs identical to said first and said second plates and affixed so that all the alpha emitting portions and target portions of said first plates are in alignment and all the target portions and alpha emitting portions of said second plates are in alignment.

11. The apparatus of claim 10 in which the alpha emitting portions and the target portions of said first and said second plates are on both sides of each of said plates and adjacent to the like portion on the opposite side of each of said plates.

12. The apparatus of claim 11 including a capsule enclosing all said first and said second plates and said shaft.

13. The apparatus of claim 12 in which said plates that are not connected to said shaft are connected to said capsule.

14. The apparatus of claim 12 wherein said capsule is portable.

15. A switchable neutron generating device comprising:
   a. a capsule;
   b. a first plate surface having an alpha emitting portion, said first plate surface located inside said capsule;
   c. a second plate surface adjacent to said first plate surface and having a target portion, said second plate surface also located inside said capsule;
   d. an armature located inside said capsule and connected to one of said plate surfaces, and;
   e. rotating means located outside said capsule adjacent to said armature, said rotating means capable of inducing movement of said armature through said capsule by magnetism
   whereby the alpha emitting portion of said first plate surface and the target portion of said second plate surface can be proximately aligned thereby generating neutrons from the target portion of said second plate surface.

16. The device of claim 15 in which said capsule is completely sealed and airtight.

17. The device of claim 16 in which said device is double-walled.

18. The device of claim 17 in which said armature is connected to one of said plate surfaces by a shaft.

19. The apparatus of claim 18 in which said first plate surface is a circular disk and said second plate surface is a circular disk.

20. The apparatus of claim 19 wherein one of said plate surfaces is connected to said shaft at a central aperture in said plate surface and the other of said plate surfaces has a central aperture through which passes said shaft.

21. The apparatus of claim 20 in which said first plate surface has a plurality of alpha emitting portions.

22. The apparatus of claim 21 in which said second plate surface has a plurality of target portions.

23. The apparatus of claim 21 in which the alpha emitting portions of said first plate surface are selected from the group consisting of $^{242}$curium, $^{241}$americium, $^{238}$plutonium, $^{227}$actinium, $^{228}$thorium, and $^{210}$polonium.

24. The apparatus of claim 22 in which the target portions of said second plate surface are selected from the group consisting of beryllium, boron, and lithium.

25. The apparatus of claim 22 in which the alpha emitting portions of said first plate surface are pie shaped segments of equal size and equally spaced about the plate surface.

26. The apparatus of claim 25 in which the target portions of said second plate surface are pie shaped segments of equal size and equally spaced about the plate surface.

27. The apparatus of claim 26 in which said first plate surface includes target portions positioned between said alpha emitting portions and said second plate surface includes alpha emitting portions positioned between said target portions.

28. The apparatus of claim 27 in which the alpha emitter portions and the target portions of said first and said second plate surface are separated by inert portions.

29. The apparatus of claim 28 including a plurality of said first and said second surface plate pairs identical to said first and said second plate surfaces and affixed so that all the alpha emitting portions and target portions of said first plate surfaces are in alignment and all the target portions and alpha emitting portions of said second plate surfaces are in alignment.

30. The apparatus of claim 29 in which the alpha emitting portions and the target portions of said first and said second plate surfaces are on both sides of each of said plate surfaces and adjacent to the like portion on the opposite side of each of said plate surfaces.

31. The apparatus of claim 30 in which said plate circular disks that are not connected to said shaft are connected to said capsule.

32. The apparatus of claim 30 wherein said capsule is portable.

33. The apparatus of claim 32 in which said capsule is made of stainless steel.

* * * * *